(12) United States Patent
Dupont et al.

(10) Patent No.: US 6,592,955 B1
(45) Date of Patent: Jul. 15, 2003

(54) THERMOPLASTIC HOLLOW MOLDED BODY

(75) Inventors: Serge Dupont, Vilvoorde (BE); Jules-Joseph Van Schaftingen, Wavre (BE)

(73) Assignee: Solvay ( Societe Anonyme), Brussels (BE)

( * ) Notice: Subject to any disclaimer, the term of this patent is extended or adjusted under 35 U.S.C. 154(b) by 0 days.

(21) Appl. No.: 09/806,712

(22) PCT Filed: Sep. 17, 1999

(86) PCT No.: PCT/EP99/07005

§ 371 (c)(1),
(2), (4) Date: Jul. 12, 2001

(87) PCT Pub. No.: WO00/21750

PCT Pub. Date: Apr. 20, 2000

(30) Foreign Application Priority Data

Oct. 8, 1998 (BE) ............................................. 09800727

(51) Int. Cl.[7] ......................... B32B 27/06; B32B 27/08; B32B 27/30; B32B 27/34; F16L 11/04
(52) U.S. Cl. ................. 428/35.7; 428/36.7; 428/426.1; 428/516; 428/903.3
(58) Field of Search ................................ 428/35.7, 36.7, 428/476.1, 516, 903.3

(56) References Cited

U.S. PATENT DOCUMENTS 6,302,153 B1 * 10/2001 Merziger .................... 138/137

FOREIGN PATENT DOCUMENTS

FR 2697892 A1 * 5/1994

* cited by examiner

*Primary Examiner*—Sandra M. Nolan
(74) *Attorney, Agent, or Firm*—Larson & Taylor PLC

(57) ABSTRACT

Multilayer hollow body comprising an inner layer which comprises a conductive compound based on a virgin polyolefin or a virgin polyamide, an outer layer comprising a virgin polyolefin, a layer which is a barrier to hydrocarbons, at least one adhesive and at least one layer comprising recycled plastic.

Process for manufacturing this hollow body using the technique of coextrusion blow moulding, comprising a step of extruding a parison, a step of transversely preforming the parison by means of a tool and a moulding step.

9 Claims, No Drawings

THERMOPLASTIC HOLLOW MOLDED BODY

The present invention relates to a thermoplastic multilayer hollow body.

Thermoplastic multilayer hollow bodies have been developed to meet usage needs which require properties that cannot be conferred by a single thermoplastic. In particular, this technique is used when it is a question of manufacturing thermoplastic hollow bodies which have both high rigidity at ordinary temperature and good impermeability to certain liquids that they are intended to contain. In this case, the impermeabilizing function is generally conferred by a thin internal layer of low mechanical strength which is made of a material behaving as a barrier to the liquid and vapours of this liquid which are contained in the hollow body.

In certain situations, when for example the hollow body is in contact with a liquid which is electrically non-conducting and when this liquid rubs against a surface of this hollow body, static electricity can be generated at this surface because of the low electrical conductivity that standard plastics usually have. When the electrostatic potentials generated are sufficiently high, sparks may occur, particularly in dry atmospheric conditions. If the liquid in contact with the charged surface of the hollow body is inflammable, there is a risk of explosion and destruction of the hollow body and its environment.

Solutions have consequently been developed to counter the build-up of static electricity on the surface of hollow bodies liable to come into contact with poorly conducting inflammable fluids. Among these solutions are encountered devices for earthing the hollow bodies and their supports by means of metal components which are good electrical conductors or else the incorporation into the plastic of the hollow bodies of additives so as to make them good conductors.

However, in certain cases the presence of these additives at the surface of the hollow body means that the conventional impermeabilizing treatments carried out by making the surface to be treated come into contact with gaseous fluorine can no longer be carried out correctly, especially when the fluorination treatment is carried out during the blow moulding used to manufacture the hollow body.

Moreover, the incorporation of conductive additives throughout the thickness of the walls of a hollow body unfavourably alters the mechanical properties of the end product and frequently increases the cost to the extent of making it economically unacceptable.

Attempts have therefore been made to manufacture hollow bodies having a multilayer structure in which the conductive thermoplastic is at the surface and the impermeabilization is provided by the presence of an internal layer comprising an impermeable material ("barrier" material).

International Patent Application WO 95/05940 describes a composite thermoplastic material formed from five layers comprising a core of an ethylene/vinyl alcohol copolymer surrounded on each side by an adhesive layer followed by a base layer which may be a polyolefin, for example high-density polyolefin. A conductive material, such as a metal powder or carbon powder, may be incorporated into one of the base layers or applied to it in the form of an additional layer at the outer surface.

However, known multilayer structures comprising a conductive surface and an internal barrier layer require base layers which comprise a high-performance material and are relatively thick in order to stiffen the assembly and achieve acceptable mechanical properties. When they have to withstand stresses compatible with intensive use, for example when they are associated with fuel tanks for motor vehicles, this results in the need to process a large amount of high-performance material and consequently this results in a high cost both of the raw material and of the finished multilayer structure.

It is an object of the invention to provide a conductive multilayer hollow body which is able to withstand high mechanical stresses, is highly impermeable to the products that it is intended to contain and has a reasonable cost.

For this purpose, the invention relates to a thermoplastic multilayer hollow body which comprises an inner layer comprising a conductive compound based on a virgin polymer selected from polyolefins and polyamides, an outer layer comprising a virgin polymer selected from polyolefins and polyamides, and at least one barrier layer and at least one adhesive, according to which it also includes at least one layer comprising recycled plastic.

The term "hollow body" is understood to mean any structure whose surface has at least an empty or concave part. In particular, the hollow body may have the shape of a tube or a pipe.

According to the invention, the hollow body is a thermoplastic multilayer, that is to say it is formed from a stack of several layers comprising thermoplastic.

The term "thermoplastic" is understood to mean any thermoplastic polymer, including thermoplastic elastomers, and blends thereof. The term "polymer" is understood to mean both homopolymers and copolymers (especially binary or ternary copolymers). Non-limiting examples of such copolymers are: random copolymers, alternating copolymers, block copolymers and graft copolymers.

The thermoplastic of one particular layer may be the only one in the multilayer structure of the hollow body. It may also be found in at least two separate layers of this structure. When it is in only a single layer or, on the contrary, in more than one layer of the structure, a particular thermoplastic may be by itself or in the presence of other compounds chosen from additives of a wide variety of types, these being intended to modify the intrinsic properties of the thermoplastic and are well known to those skilled in the art. Examples of such additives are, non-limitingly: fillers, stabilizers, plasticizers, lubricants, UV screens, etc. It is also possible to combine at least two different thermoplastics within a single layer of the structure. In this case, the layer may also possibly contain at least one of the abovementioned additives.

According to the invention, the hollow body comprises an inner layer comprising a conductive compound based on a polymer selected from polyolefins and polyamides.

The term "inner layer" is understood to mean the innermost layer of the hollow body on the same side as a concave part of this body. Often, the inner layer is that in direct contact with the fluid.

The conductive compound is a compound comprising at least one thermoplastic selected from polyolefins and polyamides and at least one additive which gives the compound good antistatic properties. The intended objective is to give the inner layer a low electrical surface resistivity. In general, a surface resistivity is considered to be low when it is at most $10^6$ ohms/□, as measured according to the procedure described in Standard CEI/IEC 93: 1980 (2nd edition). In practice, the conductive thermoplastic layers which comprise a conductive compound, the surface resistivity of which is at most $0.5 \times 10^6$ ohms/□ are preferred. Excellent results have been obtained with conductive layers having a surface resistivity of at least $0.1 \times 10^6$ ohms/□ and of at most $0.5 \times 10^6$ ohms/□.

Such conductive compounds comprise a polyolefin or polyamide base to which a certain amount of electrically conductive additive is added. As conductive additives, it is possible to use, non-limitingly, one or more of the following additives: carbon black, carbon powder or carbon fibres, and conductive polymers. The term "conductive polymer" is understood to mean polymers that are intrinsically electrically conductive, such as, for example, those belonging to the class of polythiophenes, polypyrroles and polyindoles. Such conductive polymers are described, for example, in European Patents 0240063, 0323656, 0375005, 0408105, 0525856, 0416672, 0413382, and 0469667 and in U.S. Pat. No. 5,290,891.

Additives based on elemental carbon are preferred. Carbon black is the conductive additive most often preferred.

The amount of conductive additive used is generally at least 0.1%, preferably at least 2%, by weight with respect to the conductive compound. Particularly preferably, this amount of conductive additive is at least 5% by weight with respect to the conductive compound. It is generally mentioned that the conductive additive in the compound does not exceed 25% by weight, and preferably does not exceed 20% by weight. It is particularly advantageous not to exceed 15% by weight of this conductive additive in the compound.

In the particular case of conductive polymer additives, the inner layer may consist of a blend of this polymer with a polyolefin or a polyamide. It may also consist completely of this conductive polymer, without including either a polyolefin or a polyamide.

The term "virgin polymer" is understood to mean a polymer into which no recycled plastic has been blended, but which may possibly contain one or more additives as defined above.

Preferably, the conductive compound is free of any recycled plastic.

The term "polyolefin" is understood to mean any olefin homopolymer, any copolymer containing at least two different olefins, and any copolymer comprising at least 50% by weight of olefin-derived units. Several polyolefins may also be used as a blend.

As examples of polyolefins that can be used, mention may be made, non-limitingly, of: polyethylene, ethylene-butene copolymers and ethylene-hexene copolymers. Preferably, the polyolefin is a polyethylene. High-density polyethylene has given excellent results, particularly with regard to liquid hydrocarbon contents.

The term "polyamide" is understood to mean any homopolymer based on an amide unit, any copolymer comprising at least two different amide units and any copolymer comprising at least 50% by weight of units derived from an amide. It does not matter whether the amide units of this definition are obtained by the opening of the ring of a cyclic polyamide or by the polycondensation of a dicarboxylic acid with a diamine. Several polyamides may also be used as a blend.

As examples of polyamides that can be used, mention may be made, non-limitingly, of: PA-6, PA-11 and PA-12. PA-6 is generally preferred.

Symmetrically with the definition of the inner layer, the term "outer layer" is understood to mean the outermost layer of the structure on the same side as a convex part of the hollow body.

The outer layer also comprises a virgin polymer selected from polyolefins and polyamides. The polyamides or polyolefins of the outer layer are of the same type as those defined above in the case of the inner layer. In one particular hollow body, the inner layer and the outer layer may comprise the same virgin polymer or of a different polymer.

The hollow body according to the invention also comprises a barrier layer. The term "barrier layer" is understood to mean a layer impermeable to liquids and gases. The barrier layer is most often an internal layer of the multilayer structure which comprises a barrier resin. Any known barrier resin can be used, as long as it is effective against fluids in contact with the hollow body, particularly hydrocarbons, and as long as it is compatible with the moulding technique used to form this hollow body. Among the resins that can be used, mention may be made, non-limitingly, of: polyamides or copolyamides, or random ethylene/vinyl alcohol copolymers. A blend of various barrier resins may also be used. Very good results have been obtained with a barrier resin made of a random ethylene/vinyl alcohol copolymer.

Preferably, the barrier layer does not contain any additive and essentially consists of barrier resin.

According to the invention, the hollow body also comprises at least one adhesive. The function of this adhesive is to allow the adhesion of two adjacent layers, which by themselves have no tendency to bond together, and thus to greatly increase the resistance to delamination. This adhesive may be in a separate additional layer of thermoplastic inserted between the two layers to be bonded together. In certain cases, it constitutes itself the thermoplastic of the adhesive layer. The adhesive may also be blended with the thermoplastic of one of the layers to be bonded, or even both.

The nature of the adhesive present in the hollow body according to the invention may vary widely from one hollow body to another, provided that this adhesive remains compatible with the others making up the hollow body and with which it is in contact and provided that it does not significantly degrade the mechanical properties of the overall multilayer structure.

As examples of adhesives, mention may be made of those described in French Patent Application 98/03571.

The adhesive most often used is generally a polymer adhesive in the form of a functionalized polyolefin. The term "functionalized polyolefin" is understood to mean any polyolefin comprising, in addition to the units derived from olefins, functional monomeric units. These may be incorporated either into the main chain of the polyolefin or into its side chains. They may also be incorporated directly into the backbone of these main and side chains, for example by the copolymerization of one or more functional monomers with the olefin monomer or monomers, or else they may result from the grafting of one or more functional monomers onto the said chains, after the polyolefin has been manufactured. Several functionalized polyolefins may also be used as a blend.

The functional monomeric units of the functionalized polyolefin may be chosen from carboxylic acids, dicarboxylic acids and the anhydrides corresponding to these diacids. These monomeric units generally come from the copolymerization or from the grafting of at least one unsaturated monomer possessing the same functional groups. Examples of monomers than can be used are, non-limitingly, acrylic acid, methacrylic acid, maleic acid, fumaric acid, itaconic acid, maleic anhydride, fumaric anhydride and itaconic anhydride. Preferably, the functional monomeric units come from the copolymerization or from the grafting of maleic anhydride.

The multilayer hollow body according to the invention must also comprise at least one layer comprising recycled plastic.

The term "recycled plastic" is understood to mean a plastic obtained by grinding up scrap obtained from various steps in the manufacture of a hollow body, particularly the multilayer hollow body according to the invention, or by grinding up spent hollow bodies at the end of their life.

According to one particular embodiment of the multilayer hollow body according to the invention, the outer layer comprises a conductive compound. The nature of the conductive compound present in the outer layer is similar to that described above in the case of the inner layer. The same conductive compound may be used in each of the inner and outer layers. In contrast, it is also possible to use conductive compounds of different type in the inner and outer layers. Blends of different compounds may also be used in the inner layer and/or in the outer layer.

According to another particularly advantageous embodiment of the multilayer hollow body according to the invention, the layers lying on each side of a barrier layer comprise at least one adhesive.

A variant of this embodiment is that in which the layers which comprise adhesive contain no recycled plastic.

Another especially beneficial variant of this particular embodiment is the multilayer hollow body in which the adhesive is blended into at least one of the layers of the hollow body, without constituting a separate layer. Preferably, the adhesive is blended into a different layer of the hollow body from the barrier layer. Advantageously, the adhesive is blended into at least one layer adjacent to the barrier layer. It is particularly advantageous for the adhesive to be blended into two layers lying on each side of the barrier layer, without constituting separate layers.

In another embodiment of the hollow body according to the invention, at least one layer comprising recycled plastic lies between the barrier layer and the inner layer. This layer comprising recycled plastic may be adjacent to the inner layer. In contrast, it may also be adjacent to the barrier layer or to the layer comprising an adhesive. In certain structures, it may also be adjacent both to the inner layer and to the barrier layer or to the layer comprising an adhesive.

Preferably, this layer comprising recycled material also comprises at least one adhesive.

Preferably, the hollow body according to the invention consists of four layers arranged in the following order:
a) an inner layer comprising a conductive compound based on a virgin polyolefin;
b) a layer comprising recycled plastic and at least one adhesive;
c) a layer which is a barrier to hydrocarbons;
d) an outer layer based on a virgin polyolefin comprising at least one adhesive.

Another embodiment of the hollow body according to the invention is also the hollow body in which at least one layer comprising recycled plastic lies between the barrier layer and the outer layer. Parallel with the previous embodiment, this layer comprising recycled plastic may be adjacent to the outer layer. In contrast, it may also be adjacent to the barrier layer or to the layer comprising an adhesive. In certain structures, it may also be adjacent both to the outer layer and to the barrier layer or to the layer comprising an adhesive.

Preferably, this layer comprising recycled plastic also comprises at least one adhesive.

A preferred variant of the hollow body according to the invention, compatible with various embodiments detailed above, comprises a layer based on a non-conductive polyolefin contiguous with an inner layer comprising a conductive compound based on a virgin polyolefin. In this variant, the impact strength of the conductive inner layer is advantageously improved.

A hollow body according to the invention which has given good results consists of seven layers arranged in the following order:

a) an inner layer comprising a conductive compound based on a virgin polyolefin;
b) a layer based on a virgin polyolefin;
c) a layer comprising at least one adhesive;
d) a layer which is a barrier to hydrocarbons;
e) a layer comprising at least one adhesive;
f) a layer comprising recycled plastic;
g) an outer layer based on a virgin polyolefin.

The hollow body according to the invention may form part of any plastic object in contact with electrically non-conductive inflammable liquids. It may, for example, be incorporated into the neck of containers or into pipes intended for filling closed containers or tanks. It is particularly well suited for use as the filling pipe for thermoplastic fuel tanks. In particular, it may advantageously constitute the filling pipe for the thermoplastic fuel tanks with which motor vehicles are fitted.

By extension, the hollow body according to the invention may also comprise the filling connector for a fuel tank as well as the tank itself. The filling connector is the part fastened to the outer end of the filling pipe and has the function of guiding the nozzle with which the hoses of the fuel delivery pumps of service stations are equipped. It may constitute a separate piece from the actual filling pipe or, on the contrary, form an integral part of the end of the latter.

By extension too, the hollow body according to the invention also denotes any technical piece made of plastic which would be fastened to a fuel tank or which would cooperate with the latter and that it would be desirable to protect from the build-up of static electricity.

The conductive hollow body described above withstands high mechanical stresses while still having a high level of impermeability to the products that it is intended to contain. Moreover, it still has a reasonable cost.

Consequently, the invention also relates to a process for manufacturing a hollow body according to any one of the preceding claims using the technique of coextrusion blow moulding, comprising a step of extruding a multilayer parison, a step of preforming the parison and a step of moulding this parison, which process is carried out semi-continuously with at least one moulding station and the following operations are carried out:
a) in the extrusion step, which is continuous, a multilayer thermoplastic tube is formed, which is pinched off and cut so as to form parisons which are continuously deposited on a conveyor belt;
b) in the preforming step, the deposition of each parison on the conveyor belt is accompanied by a transverse preforming operation by means of a tool;
c) the preformed parison is moved into a moulding station above an open mould part and the parison is deposited therein;
d) the mould is closed and the parison is blow-moulded;
e) the mould is opened and the hollow body formed is ejected.

Operations b) to e) are not continuous and employ one or more moulds. When more than one mould is used, it is then possible to achieve parison extrusion times shorter than parison moulding times.

The term "transverse preforming" is understood to mean any operation or series of operations intended to modify the geometry of the parison in the direction perpendicular to that in which it is extruded, between the moment it is extruded and the moment it is introduced into a mould.

The operation of transversely preforming the parison is carried out by means of a tool, which may be of any type known to those skilled in the art. It may, for example, be a jig which pinches off the parison laterally.

Advantageously, at least one transverse preforming tool matches, at least in part, the longitudinal profile of the conveyor belt.

A beneficial variant of the process according to the invention comprises the use of a parison-preforming tool which is not plane. Advantageously, the longitudinal profile of the conveyor belt is not plane and the preforming tool matches, at least in part, its longitudinal profile.

The examples which follow illustrate the invention non-limitingly. Example 1R and 2R are given by way of reference and are not according to the invention. The other examples illustrate hollow bodies according to the invention.

In these examples, the following abbreviations are used:
PE: polyethylene;
HDPE: high-density polyethylene;
LDPE: low-density polyethylene;
MA: maleic anhydride;
MAgPE: polyethylene grafted by means of maleic anhydride;
EVOH: a random ethylene/vinyl alcohol copolymer;
M0-type petrol: "CEC legislative fuel RF08-A-85" according to the name used by Haltermann GmbH;
TF1-type petrol: a mixture of 90% by volume of M0-type petrol and 10% ethanol.

EXAMPLE 1R

Six-layer pipes comprising, from the inside outwards:
a layer of conductive polyethylene compound, LNP® PDX-F98-385,
a layer of virgin HDPE, ELTEX® RSB 714 from Solvay,
an adhesive layer consisting of MA-grafted LDPE, ADMER® GT5e,
an EVOH barrier layer, EVAL® EPF 101$a$,
an adhesive layer consisting of MA-grafted LDPE, ADMER® GT5e and
a layer of virgin HDPE, ELTEX® RSB 714, were coextruded using a continuous coextrusion unit and then formed and blow-moulded in a mould.

The average thickness of the layers was 2.9 mm and the proportions in terms of thickness (from the inside outwards) were as follows:
15%, 33%, 1.5%, 1.6%, 1.9% and 47%.

The electrical surface resistivity of the pipe determined between two metal pieces inserted into the inner layer, at each of its ends, was measured to be between 0.1 and $0.5 \times 10^6$ ohms/□.

The EVOH layer was continuous, as was the inner layer of conductive HDPE compound, thereby simultaneously providing low permeability and good electrical conductivity.

The permeability to the M0-type petrol and to M1-type petrol was measured by determining the weight loss at 40° C. and gave the following results:
10 mg/day in the case of the M0 fuel and
50 mg/day in the case of the TF1 fuel.

EXAMPLE 2R

Four-layer pipes comprising, from the inside outwards:
a layer comprising a conductive polyethylene compound, LNP® PDX-F98-385,
an LDPE layer, ELTEX® RSB 714 comprising 3.5% of an MAgPE-type adhesive which comprises 1.7% MA and has a melt flow index (at 5.0 kg/190° C.) of 0.2 g/10 min.,
an EVOH barrier layer, EVAL® EPF 101$a$,
an HDPE layer, ELTEX® RSB 714 comprising 3.5% of an MAgPE-type adhesive which comprises 1.7% MA and has a melt flow index (at 5.0 kg/190° C.) of 0.2 g/10 min., were coextruded using a continuous coextrusion unit and then formed and blow-moulded in a mould.

The average thickness of the layers was 2.9 mm and the proportions in terms of thickness (from the inside outwards) were as follows:
15%, 33%, 1.6% and 50.4%.

The electrical surface resistivity of the pipe determined between two metal pieces inserted into the inner layer at each of its ends was measured to be between 0.1 and $0.5 \times 10^6$ ohms/□.

The EVOH layer was continuous, as was the inner layer of conductive HDPE compound, thereby simultaneously providing low permeability and good electrical conductivity.

The permeability to the M0-type petrol and TF1-type petrol was measured at 40° C. and was 15 mg/day in the case of the M0 petrol and 100 mg/day in the case of the TF1 petrol.

EXAMPLE 3

Six-layer pipes comprising, from the inside outwards:
a layer of conductive polyethylene compound, LNP® PDX-F98-385,
a layer based on ground-up manufacturing scrap,
an adhesive layer consisting of MA-grafted LDPE, ADMER® GT5e,
an EVOH barrier layer, EVAL® EPF 101$a$,
an adhesive layer consisting of MA-grafted LDPE, ADMER® GT5e and
a layer of virgin HDPE, ELTEX® RSB 714, were coextruded using a continuous coextrusion unit and then formed and blow-moulded in a mould.

The average thickness of the layers was 2.9 mm and the proportions in terms of thickness (from the inside outwards) were as follows:
15%, 33%, 1.5%, 1.6%, 1.9% and 47%.

The electrical surface resistivity of the pipe determined between two metal pieces inserted into the inner layer, at each of its ends, was measured to be between 0.1 and $0.5 \times 10^6$ ohms/□, that is to say a value similar to that obtained in Example 1R where the pipe did not include a layer comprising recycled plastic.

The EVOH layer was continuous, as was the inner layer of conductive HDPE compound, thereby simultaneously providing low permeability and good electrical conductivity, similar to that of the pipe of Example 1R.

What is claimed is:

1. A thermoplastic multilayer hollow body which comprises an inner layer comprising a conductive compound based on a virgin polymer selected from polyolefins and polyamides, an outer layer comprising a virgin polymer selected from polyolefins and polyamides, and at least one barrier layer and at least one adhesive, characterized in that it also includes at least one layer comprising recycled plastic and in that the electrical surface resistivity of the conductive inner layer is at most $10^6$ ohms/□.

2. The hollow body according to claim 1, characterized in that the outer layer comprises a conductive compound.

3. The hollow body according to claim 1, characterized in that the layers lying on each side of a barrier layer comprise at least one adhesive.

4. The hollow body according to claim 1, characterized in that at least one layer comprising recycled plastic lies between the barrier layer and the inner layer.

5. The hollow body according to claim 1, characterized in that at least one layer comprising recycled plastic lies between the barrier layer and the outer layer.

6. The hollow body according to claim 1, characterized in that it consists of four layers arranged in the following order:
   a) an inner layer comprising a conductive compound based on a virgin polyolefin;
   b) a layer comprising recycled plastic and at least one adhesive;
   c) a layer which is a barrier to hydrocarbons;
   d) an outer layer based on a virgin polyolefin comprising at least one adhesive.

7. The hollow body according to claim 1, characterized in that it comprises a layer based on a non-conductive polyolefin contiguous with an inner layer comprising a compound based on a conductive polyolefin.

8. The hollow body according to claim 1, characterized in that it consists of seven layers arranged in the following order:
   a) an inner layer comprising a conductive compound based on a virgin polyolefin;
   b) a layer based on a virgin polyolefin;
   c) a layer comprising at least one adhesive;
   d) a layer which is a barrier to hydrocarbons;
   e) a layer comprising at least one adhesive;
   f) a layer comprising recycled plastic;
   g) an outer layer based on a virgin polyolefin.

9. The hollow body according to claim 1, characterized in that it constitutes a filling pipe for a thermoplastic fuel tank intended for a motor vehicle.

* * * * *